United States Patent [19]

Cohen

[11] Patent Number: 5,329,392
[45] Date of Patent: Jul. 12, 1994

[54] OPTICAL COMMUNICATION SYSTEM WITH MULTIPLE FIBER MONITORING

[75] Inventor: Leonard G. Cohen, Berkeley Heights, N.J.

[73] Assignee: AT&T Bell Laboratories, Murray Hill, N.J.

[21] Appl. No.: 33,912

[22] Filed: Mar. 19, 1993

[51] Int. Cl.$^5$ .......................................... H04J 14/02
[52] U.S. Cl. ................................. 359/124; 359/167; 359/173
[58] Field of Search ........................ 359/118, 124–125, 359/164, 167, 173, 110; 385/24

[56] References Cited

U.S. PATENT DOCUMENTS

| | | | |
|---|---|---|---|
| 4,555,810 | 11/1985 | Khoe et al. | 359/125 |
| 4,828,358 | 5/1989 | Blonder | 350/96.15 |
| 4,902,086 | 2/1990 | Henry et al. | 350/96.12 |
| 4,904,036 | 2/1990 | Blonder | 350/96.11 |
| 4,909,584 | 3/1990 | Imoto et al. | 359/124 |
| 5,010,346 | 4/1991 | Hamilton et al. | 359/124 |
| 5,136,671 | 8/1992 | Dragone | 385/46 |
| 5,221,983 | 6/1993 | Wagner | 359/118 |

FOREIGN PATENT DOCUMENTS 0220509  9/1991  Japan ................................ 385/24

OTHER PUBLICATIONS

C. Dragone, "An N×N Optical Multiplexer Using a Planar Arrangement of Two Star Couplers," IEEE Photonics Technol. Letter 3, 1991 812–815.

T. Kitoh, et al., "Novel Broad-Band Optical Switch Using Silica-Based Planar Lightwave Circuit," IEEE Photonics Technol. Lett. 4, 1992, 735–737.

*Primary Examiner*—Richard E. Chilcot, Jr.
*Assistant Examiner*—Kinfe-Michael Negash
*Attorney, Agent, or Firm*—M. I. Finston

[57] ABSTRACT

An optical communication network includes a fiber-optic terminal system (FOTS) coupled to internal optical waveguides (or fibers) situated within a central office or terminal. These waveguides connect to external optical fibers. A new component is provided for optically coupling the FOTS to the waveguides. This component includes planar waveguides, referred to as "main waveguides" formed on a substrate. Each main waveguide is coupled at one end to the FOTS and at the other end to an internal waveguide. Monitor waveguides, also formed on the substrate, are used to transmit OTDR signals to the main waveguides. Wavelength-division multiplexers formed on the substrate are used to couple monitor waveguides to corresponding main waveguides with respect to monitor wavelengths but not with respect to signal wavelengths.

7 Claims, 6 Drawing Sheets 5,329,392

OPTICAL COMMUNICATION SYSTEM WITH MULTIPLE FIBER MONITORING

FIELD OF THE INVENTION

The invention relates to fiber-optic communication networks, and more particularly to those networks that include passive components for routing and distribution of optical transmissions.

ART BACKGROUND

Optical fiber networks are increasingly important for the distribution of telephonic signals. One architecture of current interest for an optical fiber communication system is conveniently described with reference to FIG. 1. That architecture includes a fiber-optic terminal system (FOTS) 10 located at a central office (CO) 25. The FOTS includes receivers 20 for intercepting optical fiber transmissions coming into the CO, and transmitters 30 for initiating optical fiber transmissions which exit the CO. The optical fibers 40 which communicate directly with the FOTS are typically fibers internal to the CO. These fibers need to be interconnected with fibers 50,55 which exit the CO; i.e., with fibers in the outside plant. The interconnections are performed through a lightguide cross-connect frame (LGX) 60. A typical LGX is a sheet-metal frame which houses many fibers having ends which are adapted, by appropriate connectors, to be manually interconnected. Typically, those fibers 50 that carry outbound transmissions from the CO to the outside plant are distinct from those fibers 55 that carry inbound transmissions from the outside plant to receivers at the CO. Several thousand outside-plant fibers may enter and exit a CO which serves a metropolitan area.

Turning now to FIG. 2, an active star architecture may be used to distribute transmissions between a group of fibers 70 extending over typical lengths of 1-50 km from the CO to respective remote terminals (RTs) 80 and a much larger group of fibers 90 extending from the RTs to distant terminals (DTs) 100. The DTs may, for example, be located at individual residences, or they may be situated at curbside enclosures each of which feeds several residences. Each RT may include a FOTS for relaying optical fiber transmissions between fibers that carry signals into the FOTS and fibers that carry signals out of the FOTS. Each RT may also include an LGX for performing interconnections between the FOTS input and output fibers and the outside plant fibers which communicate with the RT.

In order to assure that the network is operating properly, it is necessary to perform tests on the network and to monitor transmissions in the fibers of the network. In particular, it is important to provide access points for testing and monitoring the fibers that emerge from the CO of FIGS. 1 and 2, and the downstream fibers emerging from the RTs of FIG. 2. The fibers at each location that are to be monitored may number in the hundreds, or even in the thousands. Monitoring of such a large number of fibers by active techniques may be prohibitively expensive. Moreover, active monitoring generally involves undesirable service interruptions. Consequently, it is desirable to provide one or more passive components which include access points for monitoring which can be used during ordinary service. However, space is likely to be limited at the CO, and even more limited at the RTs. Limitations on space may limit the number of fibers that can be monitored by conventional, passive components. Therefore, where it is necessary to monitor a very large number of fibers, it may be necessary to use miniaturized passive components for testing and monitoring of the network fibers. Miniaturizable, passive components which can be incorporated in an optical communication system, and which provide access to the fibers for testing and monitoring, are described below.

SUMMARY OF THE INVENTION

The invention involves an optical communication network. This network includes a fiber-optic terminal system (referred to hereafter as a FOTS) situated at a central office or remote terminal. The FOTS is optically coupled to a multiplicity of optical waveguiding bodies situated within a central office or a remote terminal. The FOTS transmits signals into these waveguiding bodies, or receives signals from them, or both. The signals have one or more signal wavelengths.

The network also includes an interconnection between the waveguiding bodies and corresponding optical fibers situated substantially outside of the central office or remote terminal, and a component for optically coupling the FOTS to the waveguiding bodies. The network also includes an OTDR transmitter for transmitting, into at least some of the waveguiding bodies, OTDR signals at one or more monitor wavelengths different from the signal wavelengths.

The optical coupling element of this network includes multiple planar optical waveguides formed longitudinally on a substrate body. Each of these waveguides, referred to as "main waveguides," is optically coupled at one end to the FOTS and optically coupled at the other end to one of the waveguiding bodies. Also formed on the substrate body is a multiplicity of planar monitor waveguides for transmitting OTDR signals from the OTDR transmitter to at least some of the main waveguides.

A multiplicity of wavelength-division multiplexers is also formed on the substrate body. Each of these multiplexers optically couples a corresponding monitor waveguide to a corresponding main waveguide with respect to monitor wavelengths but not with respect to signal wavelengths.

DETAILED DESCRIPTION

Figure 1:
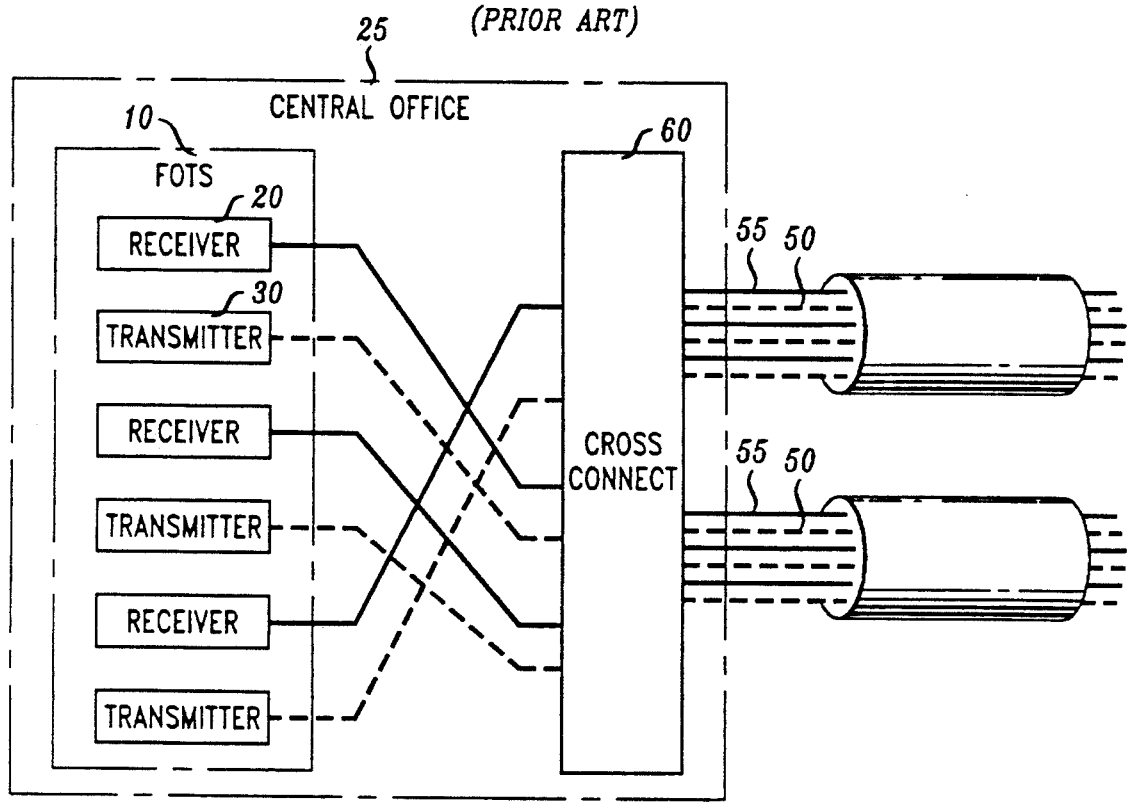
FIG. 1 is a simplified, schematic diagram of a portion of an optical communication network of the prior art. The depicted portion is housed at a central office, and includes a fiber optic terminal system and a cross-connect frame.
Figure 2:
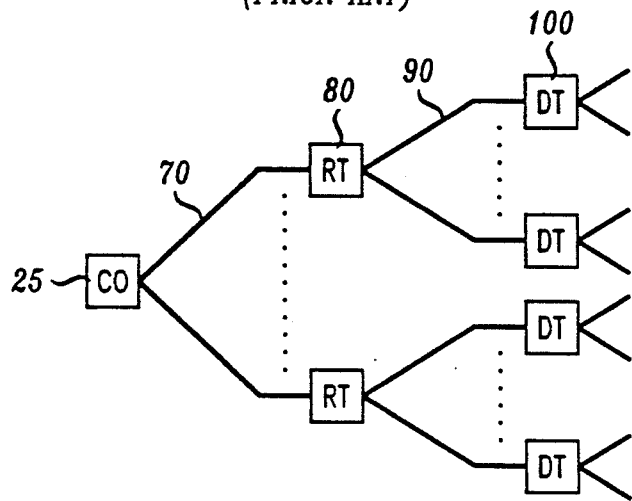
FIG. 2 is a schematic diagram of an active star network of the prior art.
Figure 3:
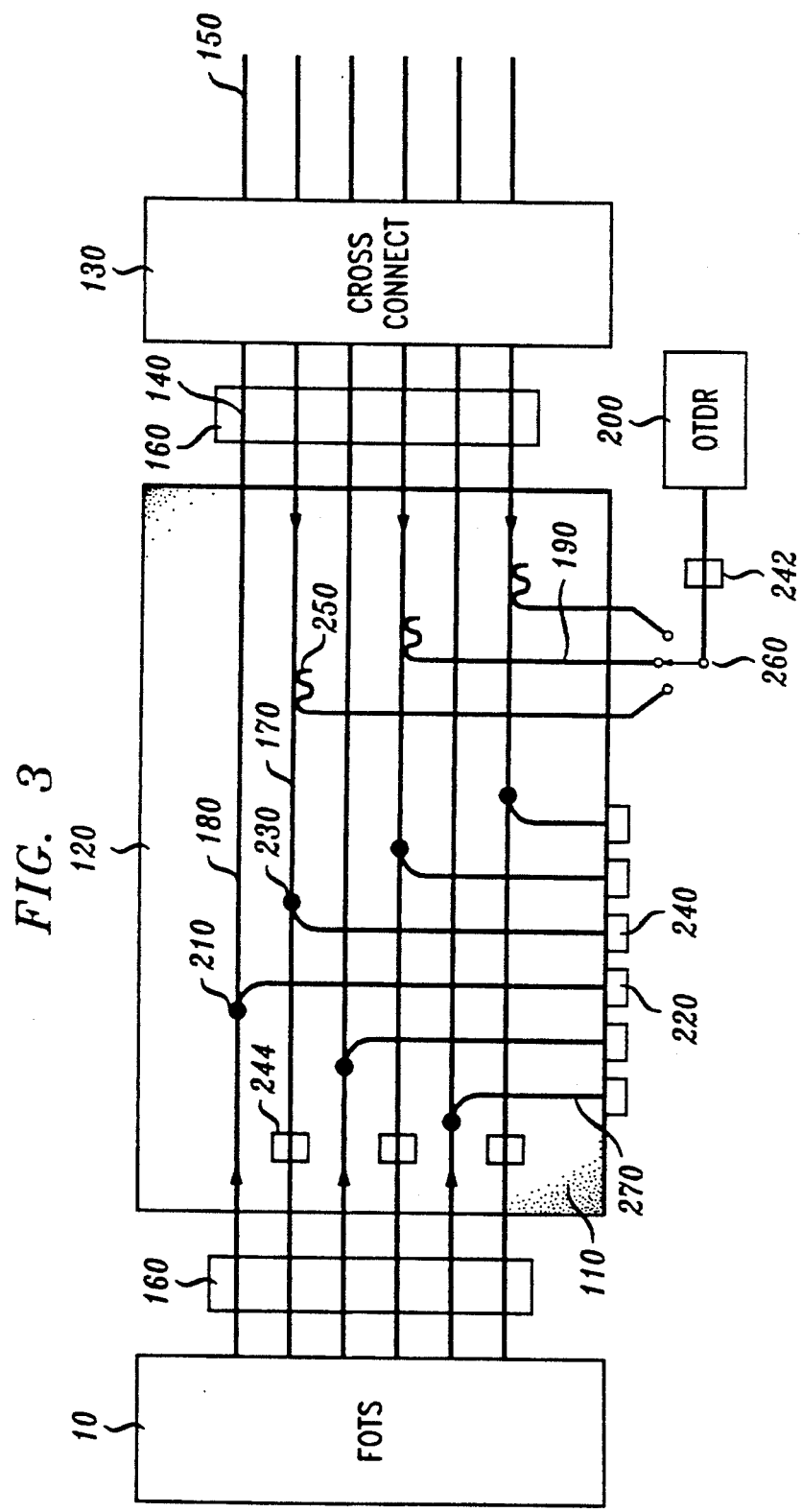
FIG. 3 is a schematic diagram of a diagnostic platform according to the invention in one embodiment. The diagnostic platform is shown connected to the fiber optic terminal system and the cross-connect frame of FIG. 1.

Turning now to FIG. 3, the invention involves an integrated component 110 formed on a substrate 120. Component 110, which is referred to herein as a "diagnostic platform", has a planar upper surface, and multiple, planar, optical waveguides formed on the upper surface. In a preferred embodiment, the substrate is a portion of a silicon wafer, and the waveguides (as well as other passive components) are lithographically processed glass waveguides. The technology for manufacturing components of this kind, often referred to as "silicon optical bench (SiOB)" technology, is well known. SiOB methods are described, for example, in U.S. Pat. No. 4,902,086, issued to C. H. Henry, et al. on Feb. 20, 1990.

In the architecture of FIG. 3, the diagnostic platform is functionally integrated with an LGX that includes N×N cross-connect switch 130 (or, alternatively, a manual switchboard) for interconnecting the N fibers 140 that emanate from the downstream side of the diagnostic platform (i.e., from the side distal the FOTS) with a corresponding set of N outside-plant fibers 150.

As many as 200, or even more, parallel waveguides are formed on the surface of the substrate. These waveguides are optically coupled to multifiber ribbon-cable connectors 160 on the upstream side and the downstream side. At, e.g., the CO, a ribbon cable connects the upstream side to the FOTS, and a second ribbon cable connects the downstream side to the cross-connect switch. A typical ribbon-cable connector will have a center-to-center fiber spacing of about 250 μm. If the substrate is cut from, e.g., a 10-cm silicon wafer, it will have a maximum dimension, transverse to the waveguides, of about 5.4 cm. If the substrate is cut from a 12.5-cm wafer, the maximum transverse dimension will be about 6.8 cm. Thus, up to about 210–270 waveguides will be able to fit on a typical substrate.

On an exemplary diagnostic platform having a total of 200 waveguides, fifty waveguides 170 will carry inbound signals, fifty waveguides 180 will carry outbound signals, and one hundred waveguides 190 will carry diagnostic transmissions for OTDR monitoring of the network. (The OTDR transceiver 200 may be locally controlled in central office applications, or remotely controlled through a supervisory fiber if it is situated at a remote terminal.) Optically coupled to each outbound waveguide is a 20-dB directional coupler 210 to divert into a monitor 220 about 1% of the optical power transmitted through that waveguide from the FOTS. The 20-dB coupler is formed as a passive, integrated component on the substrate. Similarly, a 10-dB directional coupler 230 is optically coupled to each inbound waveguide to divert into a monitor 240 about 10% of the optical power received from the outside plant through that waveguide. As depicted in FIG. 3, the inbound and outbound waveguides are arranged alternately on the substrate. Other arrangements are also possible, for example an arrangement of the inbound and outbound waveguides in two respective groups.

The OTDR waveguides will carry transmissions at one or more wavelengths $\lambda_M$ which are distinct from the signal wavelength or wavelengths. OTDR transmissions will be coupled into and out of the OTDR waveguides by means of wavelength-division multiplexers (WDMs) 250 which are also formed as passive, integrated components on the substrate.

A currently preferred WDM is a multiple-stage, Mach-Zehnder WDM described in a co-pending U.S. patent application filed by L. G. Cohen et al., entitled "Optical Filter Having Multiple Interferometric Stages." An alternative WDM design, also readily implemented using SiOB technology, is described in U.S. Pat. No. 5,136,671, issued to C. Dragone on Aug. 4, 1992, and in C. Dragone, "An N×N Optical Multiplexer Using a Planar Arrangement of Two Star Couplers", *IEEE Photonics Technol. Lett.* 3 (1991) 812–815.

A switch 260, such as an electromechanical switch, is readily provided in order to select individual OTDR waveguides in a sequential manner.

MARK Because WDMs 250 will not generally provide perfect spectral discrimination, the OTDR receiver may intercept, as noise, signal transmissions at a high enough power level to degrade the dynamic range of the OTDR for measuring optical losses. To prevent this, it is desirable to include WDM component 242 to reduce the signal power level incident on the OTDR receiver by, e.g., an additional 35–45 dB. This component is conveniently provided as, e.g., an optical fiber WDM component.

Similarly, it is possible for OTDR transmissions to interfere with the received signal transmissions, thereby increasing the bit-error rate. To prevent this, it is desirable to include reflective filters 244 to reduce the OTDR power incident on the system receivers by, e.g., an additional 20–30 dB. These filters are conveniently provided as Bragg reflective gratings formed in waveguides 170. Alternatively, filters 244 can be provided as, e.g., Bragg reflective gratings formed in the optical fibers that couple waveguides 170 to the FOTS.

As noted, directional couplers are used to divert a portion of the transmission in each inbound and outbound waveguide into a detector for monitoring. As depicted in FIG. 3, a monitor waveguide 270 brings each diverted transmission laterally across the substrate surface (i.e., in a direction perpendicular to the inbound and outbound waveguides) to an array of detectors situated at the edge of the substrate, where the monitor waveguides terminate. However, such an arrangement has the disadvantage that it involves many crossovers between monitor waveguides and inbound and outbound waveguides. For example, in the arrangement of FIG. 3, where N represents the total number of inbound and outbound waveguides, the total number of crossovers is $$\frac{N^2}{2} - \frac{N}{2}.$$

Loss of transmitted optical power is associated with crossovers between waveguides. This loss is typically about 0.05 dB or more, per crossover. The total loss grows rapidly as N increases, and may be prohibitive at values of N substantially greater than 15.

Figure 4:
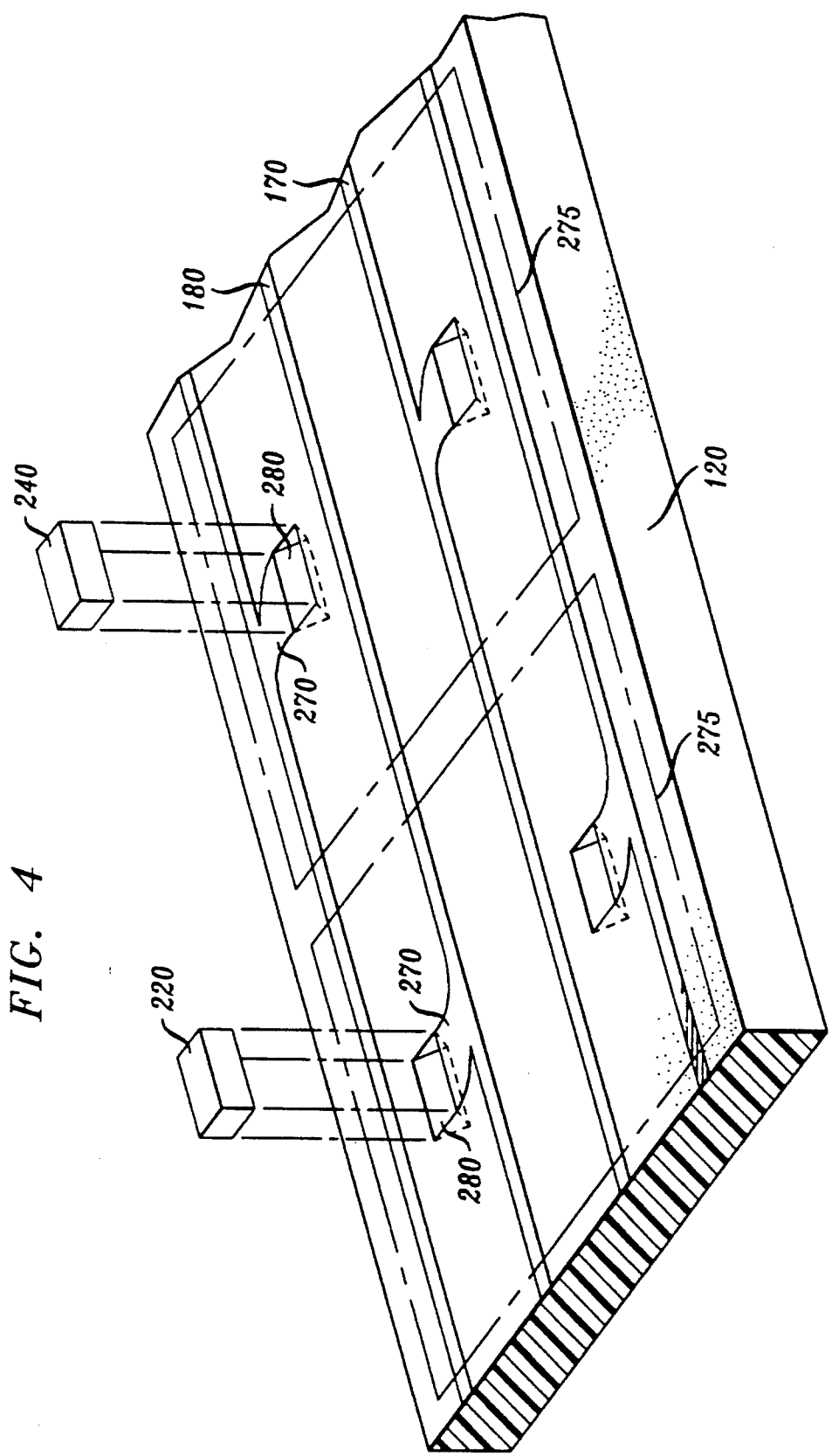
FIG. 4 is a schematic, perspective view of a substrate for the diagnostic platform of FIG. 3. Included in the figure are monitor detectors and etched surfaces for reflecting light into the detectors, according to the invention in one embodiment.
Figure 5:
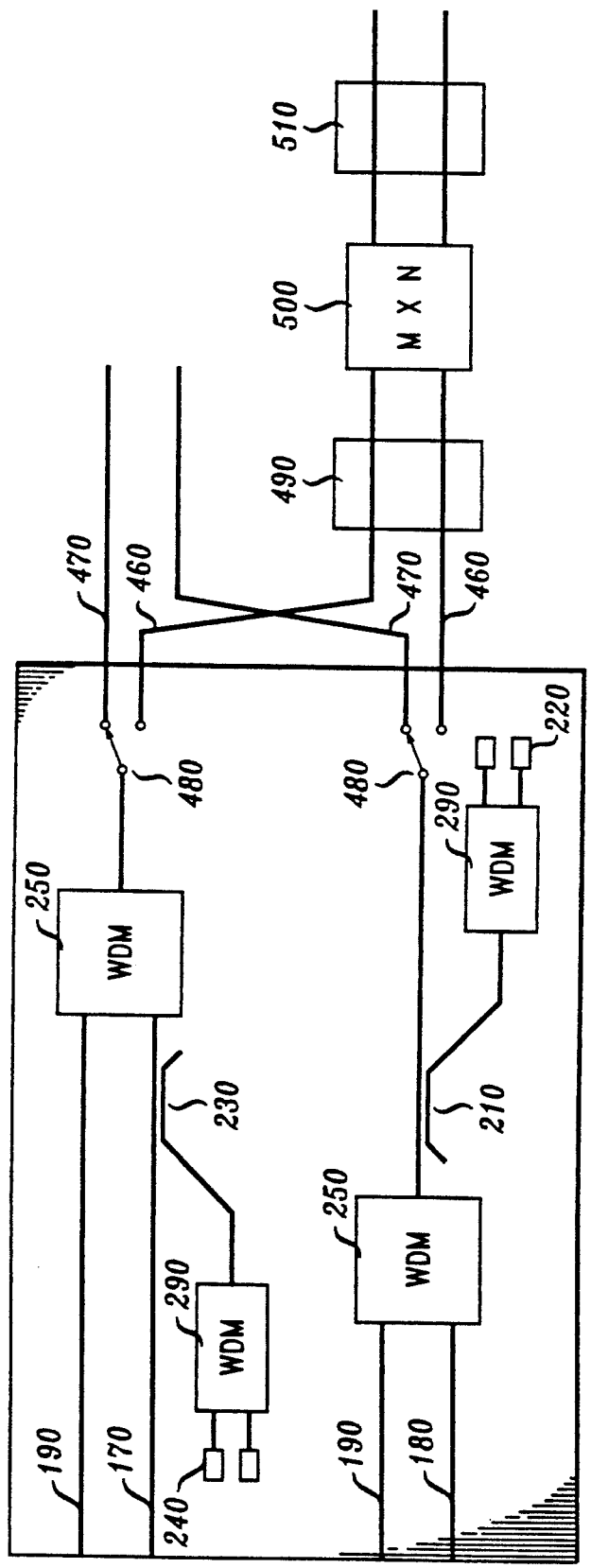
FIG. 5 is a schematic diagram of a diagnostic platform that is adapted for monitoring signals having multiple signal wavelengths. Included in the figure are wavelength-division multiplexers for coupling monitor wavelengths to an OTDR transceiver, and wavelength-division multiplexers for directing different signal wavelengths to different detectors.

Turning now to FIG. 4, crossovers are avoided in a preferred embodiment of the invention by diverting the monitored transmissions vertically instead of laterally. The monitor detectors 220, 240 form arrays 275 that are situated on the top of the substrate, overlying the waveguides, rather than at the edge of the substrate. Each monitor waveguide is relatively short, typically of a length comparable to the spacing between input and output waveguides, or less. Each monitor waveguide terminates adjacent a reflecting surface 280. Light emitted from the terminal end of each monitor waveguide 270 is directed vertically by the corresponding reflecting surface, and impinges on a photosensitive portion of the overlying detector. Transmissions at multiple signal wavelengths are readily monitored by this technique. For example, FIG. 5 shows the use of coarse WDMs 290 to separate, e.g., a 1.3-$\mu$m signal channel from a 1.55-$\mu$m signal channel and direct each to a respective detector.

The reflecting surfaces are exemplarily made by lithographic patterning and anisotropic etching of the silicon substrate. This is followed by evaporative deposition of a suitable metal, such as gold, on the reflecting surfaces. Appropriate techniques for patterning and etching the substrate are well known in the art. The use of inclined, reflective surfaces for coupling light into and out of planar waveguides is discussed, for example, in U.S. Pat. No. 4,828,358, issued to G. E. Blonder on May 9, 1989.

Optoelectronic detectors, such as InGaAs detectors, are commercially available with an individual element cross-section of 30 $\mu$m $\times$ 30 $\mu$m, and as many as 256 elements per array with a center-to-center pitch of 50 $\mu$m. These detectors are readily optically coupled to the monitor waveguides without the need for fiber pigtails. Moreover, these detectors are available with response times of about one nanosecond or less, and thus can be used for high-bit-rate monitoring.

The electrical output from the monitor detectors may be multiplexed onto a single line according to well-known techniques. Alternatively, the output from each detector element may be accessed through an electrical switch. The detector output is useful for measuring, e.g., the average laser pulse power from each transmitter, the average pulse power received from outside-plant fibers, and the pulse shapes or bit-error rates characteristic of the bit streams on the inbound and outbound fibers.

Figure 6:
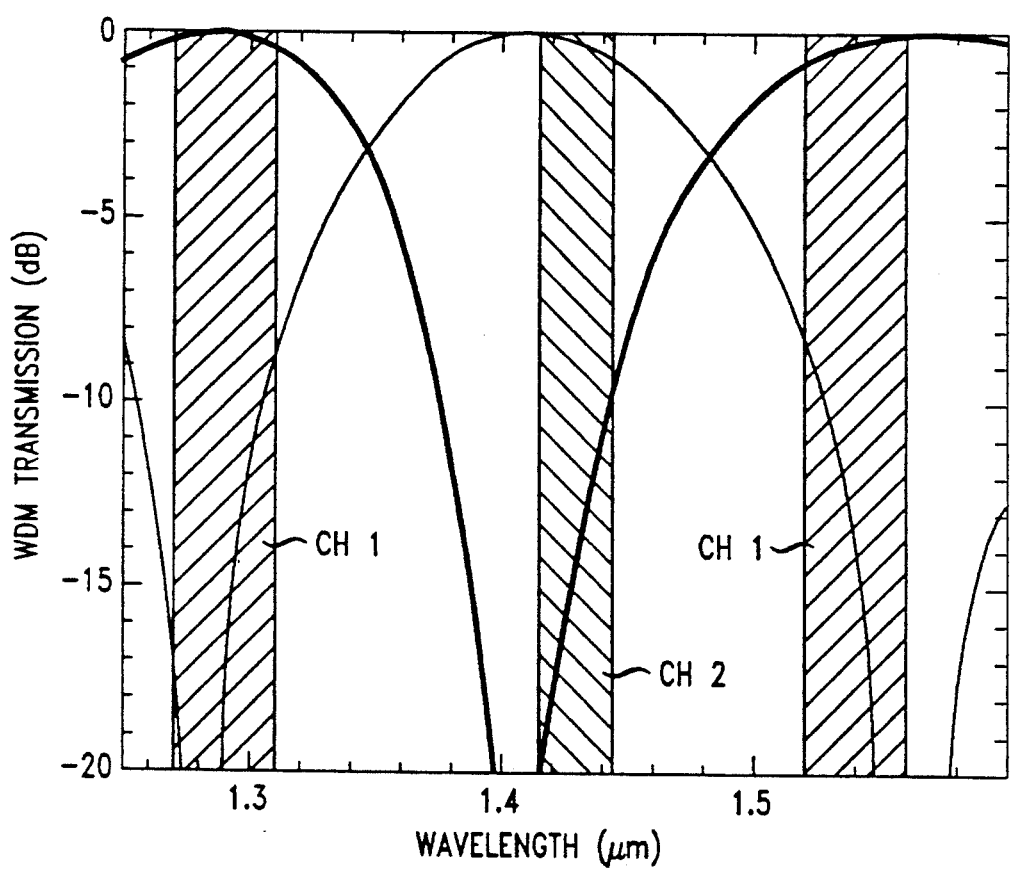
FIG. 6 shows the Channel 1 and Channel 2 transmission spectra of an illustrative wavelength-division multiplexer that is usefully incorporated in the inventive diagnostic platform.

To avoid crossovers in the OTDR waveguides, the OTDR waveguides 190 are desirably interleaved between successive inbound and/or outbound waveguides and brought out longitudinally to an edge of the substrate. An exemplary passive coupling element for the OTDR waveguides is the Mach-Zehnder WDM element described in the above-cited U.S. patent application filed by L. G. Cohen et al., entitled "Optical Filter Having Multiple Interferometric Stages." Shown in FIG. 6 is an exemplary transmission characteristic of such an element. As shown in the figure, Channel 1 of the coupling element transmits wavelengths within the 1.3-$\mu$m and 1.55-$\mu$m telecommunications regions, and Channel 2 waveguide transmits in an OTDR monitor region of 1.43–1.46 $\mu$m. Component insertion loss for a Mach-Zehnder element can be as low as 1 dB or less. The geometrical path-length difference s between the interferometric arms of the element is typically about 3–5 $\mu$m, permitting the total lateral extent of the element to be limited to 200 $\mu$m or less. As a consequence, the Mach-Zehnder element can be situated between two successive inbound or outbound waveguides, which will typically be about 250 $\mu$m apart in order to correspond with typical spacings in multifiber ribbon-cable connectors.

Figure 7:
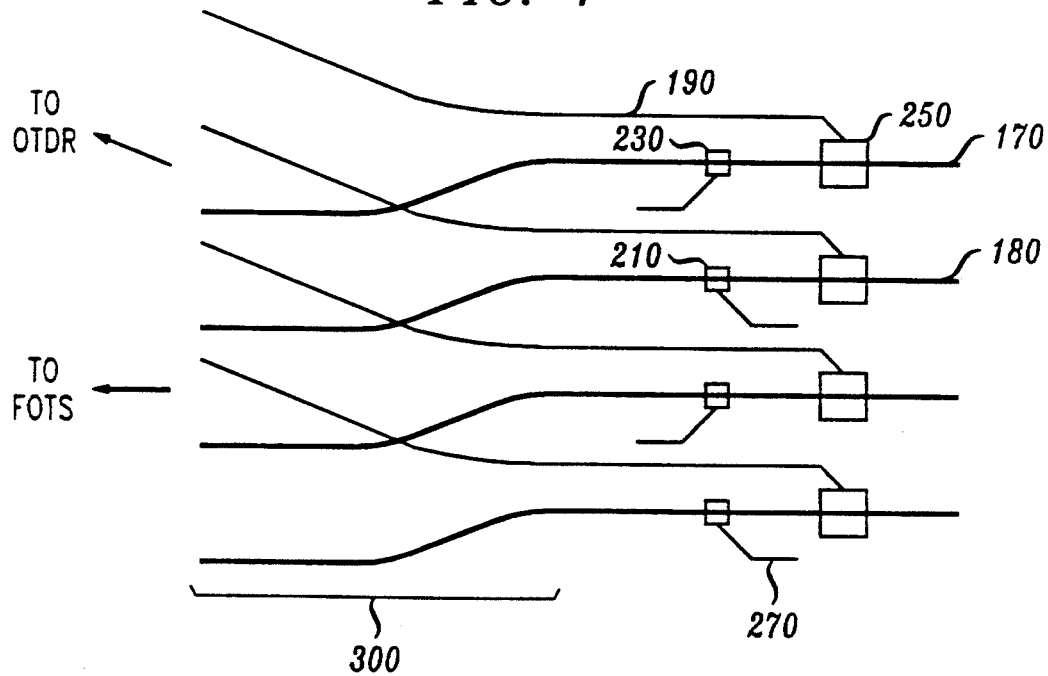
FIG. 7 is a schematic diagram showing input or output of signal transmissions and OTDR transmissions at one edge of the diagnostic platform, via a bifurcated ribbon cable.

In a preferred embodiment of the invention, the OTDR waveguides terminate at the edge of the substrate proximal the FOTS such that the ends of the OTDR waveguides alternate with the ends of the inbound and outbound waveguides. As depicted in FIG. 7, the inbound and outbound transmissions on the one hand, and the OTDR transmissions on the other, can be bifurcated along the interconnection ribbon cable 300.

A ribbon connector is preferably used to engage the fiber ribbon (or ribbons, if a separate fiber ribbon is used to carry the OTDR transmissions) to the waveguide ends at the edge of the diagnostic platform. (Alternatively, the optical fibers of the fiber ribbon can be connected directly to the diagnostic platform. This is achieved, for example, by waveguide-to-fiber couplers integrally formed on the diagnostic platform. Such couplers are described, for example, in U.S. Pat. No. 4,904,036, issued to G. E. Blonder on Feb. 27, 1990.)

Figure 8:
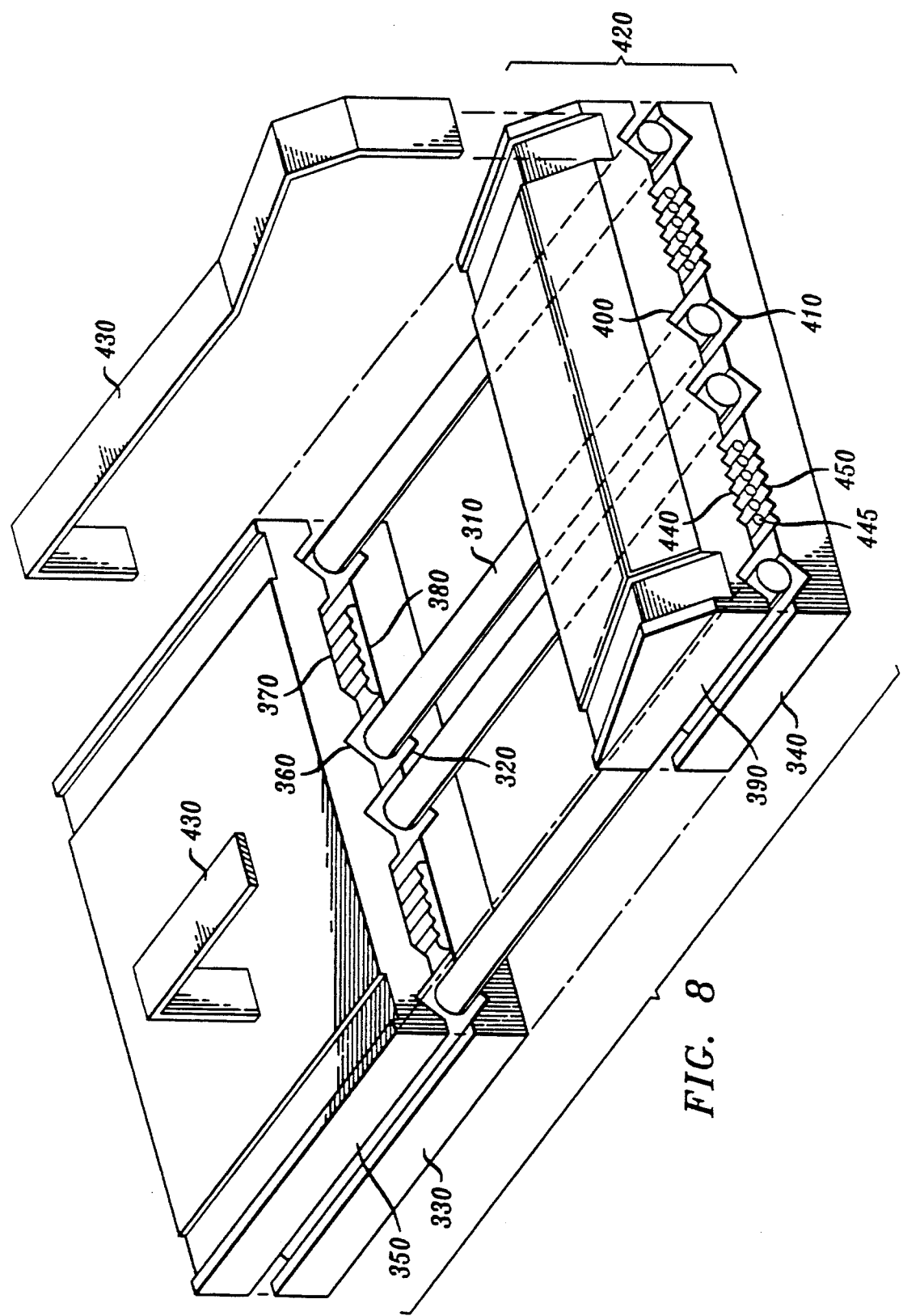
FIG. 8 is a schematic, perspective view of an assembly that includes a diagnostic platform and a ribbon connector.

For efficient optical coupling, a ribbon connector, if used, must align the waveguides to the ribbon fibers with high precision. FIG. 8 depicts an illustrative connection scheme in which longitudinal alignment rods 310 are situated in V-grooves 320 formed in the upper surface of diagnostic platform 330 and the upper surface of connector substrate 340. The diagnostic platform has a cover 350 which is exemplarily formed by anisotropically etching a portion of a silicon wafer. The cover has alignment V-grooves 360 that match V-grooves 320 on the diagnostic platform, and has at least one longitudinally extending recessed portion 370 which accommodates a corresponding group of waveguides 380 formed on the diagnostic platform. Connector substrate 340 has a cover 390. This cover has a lower surface in which alignment V-grooves 400, matching V-grooves 410 of the connector substrate, are formed. The connector cover also has an upper surface which includes a projecting edge 420 adapted to engage one or more leaf springs 430 of a snap-latch arrangement for maintaining positive contact between the connector and the diagnostic platform.

In addition to at least two alignment V-grooves, the connector substrate has at least one group of smaller V-grooves 440 for holding the optical fibers 445 of a fiber ribbon, and the connector cover has matching V-grooves 450.

The depth of fiber-holding V-grooves 440 is adapted such that the fiber cores are vertically aligned with the planar waveguide cores. In a typical assembly, the top silicon surface of the diagnostic platform is coplanar with the top silicon surface of the connector substrate. Thus, the elevation of the fiber cores may be controlled by filling the fiber-holding V-grooves to a depth corresponding to the lower cladding thickness of the diagnostic platform. This may be achieved, e.g., by subjecting the fiber-holding V-grooves to a silica deposition process simultaneously with formation of the lower cladding layer.

In a typical assembly procedure, the covers of the platform and connector are removed, the alignment rods are placed in the alignment V-grooves, the covers are replaced, the snap-latch assembly is placed on the cover of the platform, and the connector is pushed toward the platform until the snap-latch is engaged.

This connection scheme can be used, for example, to connect eight 16-fiber ribbon arrays to the diagnostic platform. Each of the eight arrays will be carried, e.g., by a separate connector. Each array will typically span a width of about 4 mm. Successive arrays will typically be separated by a clearance of about 6 mm. Accordingly, the total width spanned by the eight arrays will typically be about 74 mm. This span is readily accommodated on, e.g., a 13-cm silicon wafer.

The diagnostic platform of the foregoing discussion includes waveguides for both inbound and outbound signal transmissions. In at least some cases, it may instead be desirable to provide separate diagnostic platforms for inbound and outbound signals. For such an alternative scheme, the function of the diagnostic platform is readily divided between a receiver chip for inbound transmissions and a transmitter chip for outbound transmissions.

A further useful function of the diagnostic platform (or the receiver chip or transmitter chip) is to break connections with defective optical fibers in the outside plant, and instead to make connections with spare fibers. The spare fibers may be inbound, outbound, or bidirectional signal-carrying fibers. Thus, for example, FIG. 5 shows, on the downstream end of a diagnostic platform, a spare waveguide 460 paired with each main inbound or outbound waveguide 470. The spare waveguides are normally not connected to the FOTS. However, a 1×2 optical switch 480 is provided for each waveguide pair. This switch, when activated, will disconnect the main waveguide from the FOTS and instead connect the spare waveguide. An illustrative thermally activated switch that may be useful in this context is described in T. Kitoh, et al., "Novel Broad-Band Optical Switch Using Silica-Based Planar Lightwave Circuit", *IEEE Photonics Technol. Lett.* 4 (1992) 735 –737.

Each of the spare waveguides can be coupled to a spare optical fiber in the outside plant. An illustrative coupling is made through a fiber ribbon connector (not shown), which connects all of the spare waveguides to a short optical fiber ribbon 490. The fiber ribbon is connected to one end of an M×N optical switch 500. The other end of the M×N switch is connected, via a second short fiber ribbon 510, to the cross-connect switch or manual switchboard, where connections are made to spare fibers in the outside plant.

I claim

1. An optical communication network which comprises:
a) a fiber-optic terminal system (hereafter, FOTS) situated at a central office or remote terminal, the FOTS adapted for transmitting signals into, or receiving signals from, a multiplicity of optical waveguiding bodies situated within the central office or remote terminal, the signals having one or more signal wavelengths;
b) means for interconnecting the multiplicity of optical waveguiding bodies with a corresponding multiplicity of optical fibers situated substantially outside of the central office or remote terminal;
c) means for optically coupling the FOTS to the multiplicity of waveguiding bodies; and
d) an OTDR transmitter for transmitting, into at least some of the optical waveguiding bodies, OTDR signals at one or more monitor wavelengths different from the signal wavelengths;

CHARACTERIZED IN THAT the optical coupling means comprise:
e) a substrate body having a substantially planar principal surface, a longitudinal direction defined parallel to the surface, and a normal direction defined perpendicular to the surface;
f) a multiplicity of longitudinally extending, planar, main optical waveguides formed on the surface, each said main waveguide optically coupled at one end to the FOTS and optically coupled at the other end to one of the waveguiding bodies;
g) a multiplicity of planar monitor waveguides formed on the surface for transmitting OTDR signals from the OTDR transmitter to at least some of the main waveguides; and
h) a multiplicity of wavelength-division multiplexers formed on the surface, each multiplexer adapted for optically coupling a corresponding monitor waveguide to a corresponding main waveguide with respect to monitor wavelengths but not with respect to signal wavelengths.

2. The network of claim 1, wherein each monitor waveguide extends substantially parallel to and adjacent to the corresponding main waveguide such that said monitor waveguide does not cross any other waveguide formed on the surface.

3. The network of claim 2, wherein:
a) the multiplicity of waveguiding bodies comprises a main optical fiber ribbon having an upstream end and a downstream end, the downstream end optically coupled to the interconnection means;
b) the network further comprises a monitor optical fiber ribbon for transmitting OTDR signals from the OTDR transmitter to the monitor waveguides, the monitor ribbon comprising a multiplicity of monitor optical fibers, each of said monitor fibers corresponding to one of the monitor waveguides;
c) the network further comprises switching means for selectivity optically coupling the OTDR transmitter to one monitor fiber at a time;
d) each main waveguide and each monitor waveguide intercepts an edge of the substrate body, to be referred to as the "downstream edge";
e) the network further comprises a connector adapted to engage the downstream edge of the substrate body; and
f) the connector is further adapted to optically couple the main ribbon to the main waveguides and the monitor ribbon to the monitor waveguides.

4. The network of claim 1, further comprising:
a) a multiplicity of longitudinally extending, planar, spare optical waveguides formed on the surface;
b) means for interconnecting the spare waveguides with a corresponding multiplicity of spare optical fibers situated substantially outside of the central office or remote terminal; and
c) switching means for alternatively optically coupling the FOTS to a selected main waveguide or to a corresponding spare waveguide.

5. The network of claim 1, further comprising:

a) a multiplicity of optical detectors overlying the principal surface such that each said detector has an optically receptive area facing the surface;
b) means for diverting a portion of electromagnetic radiation transmitted in each main waveguide; and
c) means for deflecting the diverted radiation into the direction perpendicular to the principal surface, such that each main waveguide is partially optically coupled to one of the detectors.

6. The network of claim 5, wherein:

a) the FOTS is adapted for transmitting signals at least at two signal wavelengths; and
b) the diverting means comprise wavelength-selective means for directing different signal wavelengths to different detectors.

7. The network of claim 1, wherein the FOTS is adapted for both transmitting signals into, and receiving signals from, the multiplicity of optical waveguiding bodies.

* * * * *